Dec. 14, 1965  C. B. KREKELER  3,223,452
CUTTER BIT AND SOCKET STRUCTURES
Filed Aug. 14, 1961  2 Sheets-Sheet 1
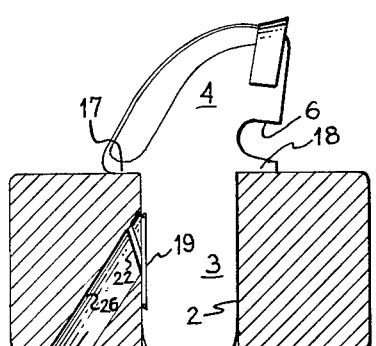
Fig. 1a
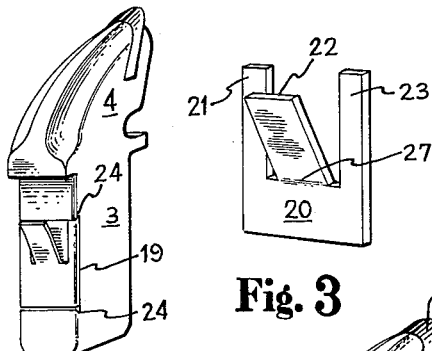
Fig. 2
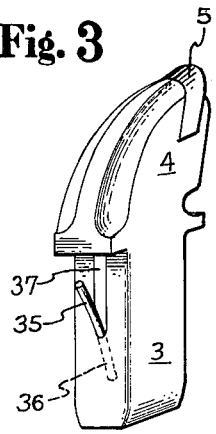
Fig. 3
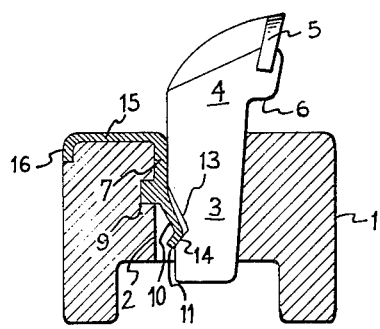
Fig. 1
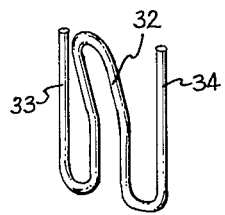
Fig. 5
Fig. 4
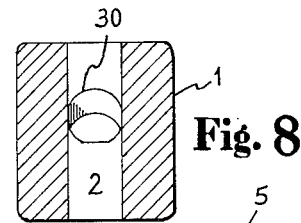
Fig. 8
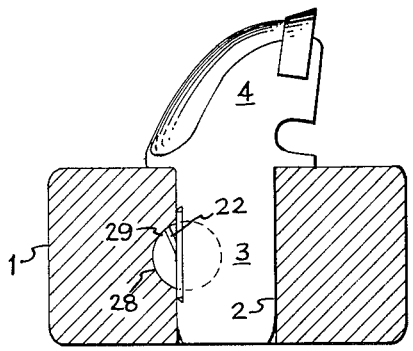
Fig. 6
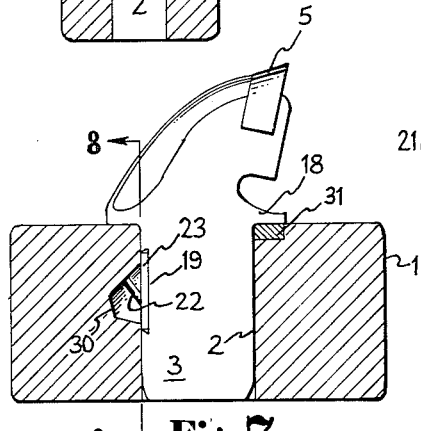
Fig. 7
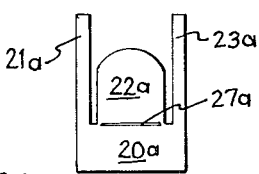
Fig. 9
INVENTOR.
CLAUDE B. KREKELER,
BY
Allen & Allen
ATTORNEYS.

Dec. 14, 1965     C. B. KREKELER     3,223,452
CUTTER BIT AND SOCKET STRUCTURES
Filed Aug. 14, 1961     2 Sheets-Sheet 2

*INVENTOR.*
CLAUDE B. KREKELER,
BY *Allen & Allen*
ATTORNEYS.

United States Patent Office 3,223,452
Patented Dec. 14, 1965

3,223,452
CUTTER BIT AND SOCKET STRUCTURES
Claude B. Krekeler, Monfort Heights, Ohio, assignor to The Cincinnati Mine Machinery Co., Cincinnati, Ohio, a corporation of Ohio
Filed Aug. 14, 1961, Ser. No. 131,282
18 Claims. (Cl. 299—92)

This application is a continuation-in-part of the co-pending application Serial No. 659,562, filed June 15, 1957, now Patent No. 2,996,291, in the name of the same inventor and bearing the same title.

The invention relates to cutter bits and holders therefor such as are used in mining machinery. In such structures powered heads or chains are provided with members having recesses or perforations forming sockets for the reception of the shanks of cutter bits or cutter bit holders. Various means have been employed to hold the shanks in the socket members, including the use of set screws. It will be understood that bits of mining machinery, as well as the heads or chain elements having the socket members, are subjected to very great stresses during the cutting operation and also to excessive vibration. Again, in many operations, the structures are subjected to corrosive mine waters as well as to excessive wear. Moreover, the bits require frequent renewal, and this operation must be kept simple.

It is a primary object of this invention to provide an improved means for retaining the shanks of cutter bits or cutter bit holders in the socket members of chains, heads, and the like.

It is an object of the invention to provide a structure in which the shank of a cutter bit or cutter bit holder can be engaged and securely held in cutting position by merely driving the shank into the perforation of a socket member; and it is a concurrent object of the invention to provide a structure such that the bit or bit holder may be readily withdrawn from the socket member by a simple prying or dislodging operation, for replacement or repair.

It is an object of the invention to provide means for this purpose which is simple in construction, not likely to get out of repair, and easily and cheaply renewable.

These and other objects of the invention, which will be set forth hereinafter or will be apparent to one skilled in the art upon reading these specifications, are accomplished by that construction and arrangement of parts of which certain exemplary embodiments will now be described. Reference is made to the accompanying drawings wherein:

FIG. 1 is a longitudinal sectional view taken through a socket member showing a cutter bit engaged therein, and held by a resilient member which is held by the socket member.

FIG. 1a shows a modified construction in which the resilient holding means is engaged with the shank of the cutter bit.

FIG. 2 is a perspective view of a cutter bit with the resilient holding means engaged thereon.

FIG. 3 is an enlarged perspective view of the resilient holding means of FIGS. 1a and 2.

FIG. 4 is a perspective view of a cutter bit having another type of resilient retaining means engaged in its shank.

FIG. 5 shows in perspective yet another form of resilient retaining means.

FIG. 6 is a longitudinal sectional view of a socket element with a cutter bit engaged in its perforation, showing resilient retaining means, and showing a modified aperture in which a portion of the resilient retaining means can engage the socket member.

FIG. 7 is a similar sectional view showing yet another configuration of the socket member for engagement with a resilient retaining means.

FIG. 8 is a sectional view taken along the section line 8—8 of FIG. 7.

FIG. 9 is a plan view of a resilient retaining means such as may be used in the structure of FIG. 7.

Figure 10:
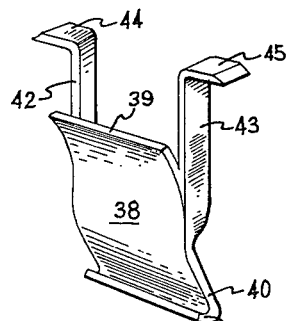
FIG. 10 is a perspective view of another form of resilient retaining means engageable with the shank of a cutter bit.

Briefly, the practice of this invention contemplates the use, along with a socket member and a cutter bit or cutter bit device having a shank, of a resilient retaining means which is in the nature of a separate structure. In certain aspects of the invention, the resilient retaining means is initially engageable with the socket member. In other modifications of the invention, the resilient retaining means is engageable with the shank of the cutter bit device, either prior to or concurrent with the insertion of the shank of the cutter bit device in the shank-receiving perforation of the socket member. In all instances the shank of the bit device can be placed in the perforation and driven home, whereupon it will be held through the action of the resilient retaining means without the use of set screws or other instrumentalities requiring separate manipulation. In all instances the bit may be removed by an upward prying action through the use of a suitable tool, and again, without manipulation of a set screw and the like. In some of the embodiments, the resilient holding means will require to be broken or bent upon the removal of the cutter bit device, but will be easily renewable or replaceable because it is simple and cheap in construction. In other instances the resilient retaining means will serve for the holding of the shanks of a succession of cutter bit devices.

Turning first to FIG. 1, there is shown a socket member or lug 1 having a perforation 2 for accepting the shank 3 of a cutter bit. The cutter bit has a head 4. In the particular embodiment, the perforation 2 and the shank of the cutter bit have been indicated as tapering or wedge-shaped, so that the distance the shank will enter the perforation will be limited by that configuration. However, this aspect of the invention is applicable to socket members having non-tapering perforations, and to cutter bits having straight shanks, in which event, of course, a gauge determining abutment will be formed on the cutter bit as hereinafter explained and illustrated. The skilled worker in the art will understand that the teachings of this invention are applicable not alone to unitary cutter bits but also to shanked devices for holding relatively smaller, renewable cutter bits; and the use of the words "cutter bit structure" herein is intended to encompass both types of device. The cutter bit shown in FIG. 1 is made as a unitary forging, has a hard alloy insert 5 to provide a cutting point, and also has a pry-out abutment indicated at 6.

The resilient engagement means in this instance is a clip-like member adapted to enter the perforation of the socket member. It has an upper portion 7 adapted to lie along the rear face of the perforation in the socket member. It has an enlargement or ear 9 adapted to enter a correspondingly shaped recess in the perforation of the socket member so as to retain the device in position, and it has a lower free end 10 which, by reason of the springiness of the material from which the device is made, is biased in the counterclockwise direction as shown in the figure. The lower end of the free portion 10 is reversely turned as at 11.

The shank of the cutter bit device is provided with a notch 13 with a lower operating surface 14 slantwise disposed to the axis of the shank. The turned-over portion 11 of the resilient retaining means engages the surface 14 as shown exerting a forward and downward force on the shank when the cutter bit device is driven home.

The clip member, as thus far described, may be used alone, or as illustrated in FIG. 1, it may have an upper extension 15 with a turned-over portion 16 so that the installation of the clip device on a socket member is facilitated and the clip device will have a snap-in action. It will now be clear that the exertion of an upward prying force upon the abutment 6 of the cutter bit device will deflect the parts 10 and 11 of the resilient holding means, permitting withdrawal of the bit, and the reuse of the clip for a succeeding bit.

FIG. 1a again illustrates in vertical cross section a socket member 1 having a shank receiving perforation 2 and a cutter bit with a shank 3 and a head 4. The perforation and the shank are in this instance not characterized by any taper, and as a consequence gauge determining abutments 17 and 18 have been shown as formed integrally on the cutter bit device adjacent the top end of its shank. In the modification shown in FIG. 1a and the accompanying FIGS. 2 and 3, a resilient holding means is engaged with the shank of the cutter bit device and is insertable in the perforation of the socket member therewith. In order to receive the resilient holding means, the rear edge of the shank is recessed as at 19. The resilient holding means, again in the form of a clip of springy metal, is most clearly shown in FIG. 3. It has a body 20 the upper part of which is severed into three sections 21, 22, 23. The sections 21 and 23 lie in the plane of the body 20, but the section 22 is biased outwardly as will be evident from the figure. The resilient retaining device may simply be placed within the recess 19, where it will be held as soon as the shank is caused to enter the perforation 2, by reason of fairly close tolerances in dimension between the shank and the perforation. Or, the resilient holding means may be more definitely attached to the cutter bit device as by rabbeting the edges of the recess as shown in FIG. 2 at 24 and similarly configuring the lower edge of the body 20 and the upper edges of the segments 21 and 23.

The perforation 2 in the socket member must have a configuration to accept the end of the segment 22 which is resiliently biased outwardly (in the counterclockwise direction in FIG. 1a). There are various ways in which such recesses may be provided. One way is shown in FIG. 1a, and is accomplished by providing a drill hole 25 extending inwardly and upwardly aslant from a bottom portion of the socket member 1 and intersecting the perforation 2 as shown. It will be evident from this figure that when the cutter bit device is driven home, the engagement of the segment 22 of the resilient retaining means against the rear wall 26 of the drill hole will produce a force urging the shank 3 of the cutter bit device in the forward direction and downwardly. When it is desired to withdrawn the bit, and a tool is engaged with the pry-out abutment 6, the segment 22 will either deflect (depending upon the angularity of the surface 26) or if desired the segment 22 may be formed with a line of weakening 27, as shown in FIG. 3, at its base. Upon the exertion of the prying force necessary to remove the bit, the segment 22 can, under these circumstances, break off and be discharged through the hole 25.

Yet another way of providing a surface accessible from the interior of the shank receiving perforation for engagement by a resiliently displaced segment or tine of a retaining member is illustrated in FIG. 6, where like parts are given like index numerals. Here a bore 28 has been formed horizontally transverse of the socket member 1, and in such position as to intercept the shank receiving perforation 2. If this bore is made with its axis at the edge or somewhat inside the rear face of the perforation 2, a slanting surface 29 will be provided for engagement by the segment 22. Again, the segment may be provided with a line of weakening insuring breakage upon the exertion of the excess force required to pry the bit out of the socket member.

Yet another way of forming a recess within the confines of the perforation of a socket member is illustrated in FIGS. 7 and 8. Here the recess is a partial bore 30 which can be formed by a bit or routing tool inserted slantwise into the perforation from the top of the socket member. The operation of the structure will be clear from the explanation which has gone before. FIG. 7 also illustrates the use of a hard insert of tungsten carbide or other suitable alloy 31 at the surface of the socket member where it is contacted by the gauging abutment 18.

FIG. 9 illustrates a slightly modified form of resilient retaining means. It is of three-pronged construction somewhat like that of the structure of FIG. 3 excepting that the segment 22a has been foreshortened somewhat and rounded on its upper edge to conform with the surface of the bore 30. This segment may also be weakened as at 27a where it joins the body 20a of the retaining structure.

FIG. 5 illustrates a retaining device which may be inexpensively manufactured from spring wire. The wire is bent to form a central loop 32, which is bent outwardly as shown, and two outer legs 33 and 34. The use of this device will be the same as that of the retaining structures shown in FIGS. 3 and 9. It is not necessary, however, to weaken the central portion, for the reason that when a prying force is exerted on the bit to remove it, the central loop 32 of the retaining device can bend to whatever extent is necessary to permit the release of the shank, or can be sheared off by the coacting parts of the socket member and the shank.

Yet another form of readily renewable retaining means is illustrated in connection with the bit of FIG. 4. This retaining means consists of a relatively short length of spring wire or other suitably springy material 35 which may be either rectilinear or slightly acruate in configuration. The lower end of the piece of wire is placed in a hole 36 formed in the shank 3 of the cutter bit. This structure will operate in the same way as the retaining structures heretofore described, that is to say, upon the removal of the cutter bit shank, it may break because of a weakening formed in it, or it may bend or shear. Where, however, there is a transverse opening or hole formed in the socket member as at 28 in FIG. 6, it will now be evident to the skilled worker in the art that the retaining resilient tine or segment may be depressed back into the plane of the rest of the retaining means by the use of a drift pin in the hole. This may also be done with the member 35 of FIG. 4 if used in the socket member of FIG. 6, and in this event a recess 37 may be formed in the rear edge of the shank of the cutter bit in order to receive the wire when in depressed condition, or to permit the wire to lie wholly inside the rear edge portion of the cutter bit, where the clearance between the shank of the cutter bit device and the perforation in the socket member is slight.

Figure 12:
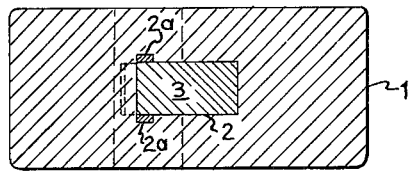
FIG. 12 is a horizontal sectional view taken along the line 12—12 of FIG. 11.
Figure 11:
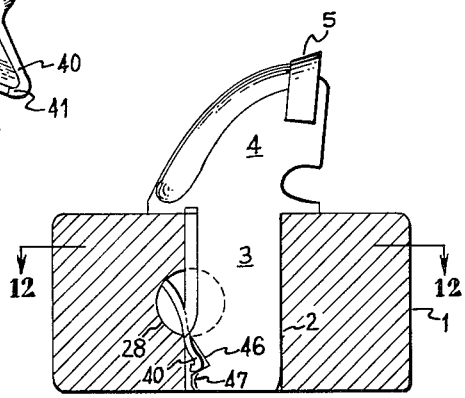
FIG. 11 is a longitudinal sectional view of a socket member with a cutter bit engaged therein, showing the use of the resilient retaining means of FIG. 10.

In FIGS. 10, 11 and 12 there is illustrated the use of yet another retaining means. This is an element which may be engaged in a socket member before the insertion of the shank of the cutter bit device, but it is also possible to engage this retaining means with the shank of the cutter bit device before insertion into the socket member. The clip device of this phase of the invention comprises a body 38, the upper end of which is bent in one direction as at 39 so as to form a resilient segment, and the lower part of which is bent in the opposite direction as at 40 to provide another resilient segment. The end of the portion 40 may be bent over as at 41. The device carries two leg members 42 and 43, the upper ends of which are turned over as at 44 and 45.

The structure as illustrated may be relatively inexpensively made from sheet metal by stamping and forming operations. The socket member is, of course, provided with a perforation 2 to accept the shank 3 of the cutter bit device; but two enlargements of this perforation are formed as shown at 2a to accept the arms 42 and 43 of the clip device. Any of the configurations heretofore described may be provided within the confines of the perforation 2 to coact with the resilient segment 39. In FIG. 11 a transverse hole has been illustrated similar to the hole 28 in FIG. 6.

In the preferred used of the device of FIG. 10, it is inserted as such into the perforation 2 so that the legs 42 and 43 lie inside the perforation enlargements 2a. Then the device may be seated by tapping upon the upper portions 44, 45 of the legs. It will thus be brought into such position that the segment 39 engages the surface of a recess in the perforation 2, such as the recess 28 illustrated.

The shank 3 of the cutter bit device is provided with a notch 46 as shown in FIG. 11, having an operating surface 47 which will be engaged by the turned over portion 41 of the lower segment 40, so that a forward and downward force is exerted upon the shank. The surface 47 may be so located and configured that upon the exertion of upward prying pressure upon the cutter bit device, the portion 40 will be depressed sufficiently to release the shank. Should it become necessary at any time to remove the clip device, this may be done after withdrawal of the shank by inserting a screwdriver or other prying tool beneath the turned-over portions 44, 45 of the legs of the clip.

Figure 14:
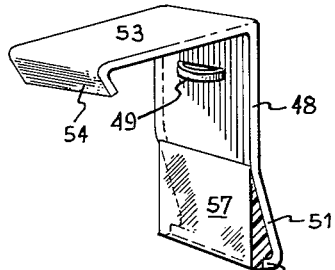
FIG. 14 is a perspective view of the resilient retaining means of FIG. 13.
Figure 13:
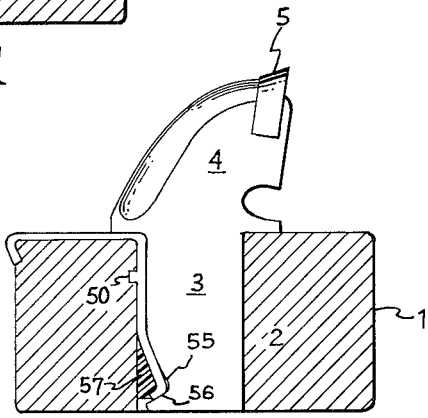
FIG. 13 is a longitudinal sectional view of a socket member showing a cutter bit engaged therein and held by yet another form of resilient retaining means.

Yet another modified structure is illustrated in FIGS. 13 and 14. Here a clip-like element is provided with a body 48 which has a displaced portion 49 adapted to enter a recess 50 in the inner rear surface of the perforation 2 of the socket member. The lower portion of the body is bent forwardly as at 51 and reversely turned as at 52 in the manner explained above. The clip device of FIGS. 13 and 14 may have and preferably has a top portion 53 and an outer down-turned portion 54 to engage over an edge of the socket member as previously described in connection with FIG. 1. The shank 3 of the cutter bit device is provided with a notch 55 having a lower operating surface 56. The coaction of the parts will be clear from the foregoing description; but in this instance a pad 57 of suitably resilient substance such as chloroprene or the like is vulcanized to the rear surfaces of parts 55 and 56. This pad maintains contact with the rear wall of the perforation 2 of the socket member so as to prevent the entry of fine cuttings and the like; but it is compressible upon the insertion or withdrawal of the shank 3 of the cutter bit device.

Modifications may be made in the invention without departing from the spirit of it. The invention having been described in certain exemplary embodiments, what is claimed as new and desired to be secured by Letters Patent is:

1. In a cutter bit device and socket member combination, a socket member, a separate resilient holding means, said socket member having a perforation to receive the shank of said cutter bit device and shaped to permit insertion and withdrawal of said shank in a direction axial of said shank, and said resilient holding means comprising a first portion lying at least partially within and extending generally longitudinally of the perforation of said socket member, said perforation being otherwise unobstructed, said first portion of said resilient holding means having supporting engagement with one of said recited elements, and a second portion of said holding means resiliently related to said first portion and having resilient engagement with the other of said recited elements against an engagement surface so located that a forward and downward force is exerted upon the shank of said cutter bit device, and means fixing said first portion against axial movement with respect to the one of said recited elements with which it has supporting engagement.

2. The structure claimed in claim 1 wherein said resilient holding means is supported from the shank of said cutter bit device, said shank having a recess to hold said first portion of said resilient holding means, there being a recess formed within the confines of said perforation and at its rear edge to receive resiliently biased portion of said resilient holding means comprising said second portion of said holding means, said recess providing said engagement surface.

3. The structure claimed in claim 2 wherein said resilient holding means has a body comprising said first portion with a portion comprising said second portion resiliently related to and extending out of the plane of said body.

4. The structure claimed in claim 2 wherein said resilient holding means has a body comprising said first portion with a portion comprising said second portion resiliently related to and extending out of the plane of said body, and wherein said resiliently related portion has a line of weakening where it joins said body.

5. The structure claimed in claim 2 wherein said resilient retaining means has a body comprising said first portion, a resilient portion comprising said second portion extending at an angle to said body, and wherein said resilient portion engages the surface of a hole formed in said socket member and intersecting said perforation, said surface of said hole comprising said engagement surface.

6. The structure claimed in claim 5 wherein said resilient holding means is an element made of wire.

7. The structure claimed in claim 2 wherein said resilient retaining means has a body comprising said first portion, a resilient portion comprising said second portion extending at an angle to said body, and wherein said resilient portion engages the surface of a hole formed in said socket member and intersecting said perforation, and wherein the axis of said hole lies in substantially the same plane as the axis of the shank of said cutter bit device, said surface of said hole comprising said engagement surface.

8. The structure claimed in claim 2 wherein said resilient retaining means has a body comprising said first portion, a resilient portion comprising said second portion extending at an angle to said body, and wherein said resilient portion engages the surface of a hole formed in said socket member and intersecting said perforation, and wherein said hole has its axis transverse to the axis of said perforation, said surface of said hole comprising said engagement surface.

9. The structure claimed in claim 1 wherein said first portion of said resilient holding means is supported from said socket member and has an abutment portion located in a recess formed in the rear wall of said perforation, and wherein the shank of said cutter bit device is formed with a notch to accept a resiliently extended portion of said resilient holding means comprising said second portion of said holding means, said notch providing said engagement surface.

10. The structure claimed in claim 1 wherein said resilient holding means constitutes a short length of resilient wire-like substance having one end comprising said first portion and engaged in a hole in the shank of said cutter bit device, the free end of said resilient holding means comprising said second portion.

11. The structure claimed in claim 1 wherein said resilient retaining means comprises a metal body having a central portion comprising said first portion and end portions bent oppositely with respect to the plane of the central portion, one of said end portions comprising said second portion, and integral leg members of said central portion extending upwardly at a right angle to the plane thereof and bent over at their upper ends.

12. The structure claimed in claim 11 wherein said perforation has enlargements to receive the legs of said resilient holding means so that the shank of said cutter bit device when in said perforation may lie between said legs.

13. The structure claimed in claim 1 wherein said resilient retaining means includes a body portion comprising said first portion lying along a face of said perforation in said socket member, a locating element on said body and extending therefrom and adapted to enter a recess formed in said face, and a lower extension on said body resiliently related thereto to extend out of the plane thereof and comprising said second portion.

14. The structure claimed in claim 13 including a top member on said body portion extending over the top part at least of said socket member, said top member having a downwardly turned outer end.

15. The structure claimed in claim 14 including a resilient filler member attached to the rear surfaces of the downward extension of said body member.

16. The structure claimed in claim 1 wherein said shank of said cutter bit has opposed edge portions, there being in one of said edge portions a hole extending inwardly and downwardly aslant to the axis of said shank and adapted to receive said first portion of a wire-like resilient retaining member, there being a groove in the same edge of said shank extending upwardly from said hole whereby a projecting end of said wire-like member comprising said second portion may be depressed substantially within the peripheral confines of said shank.

17. A cutter bit having a shank, and having a flat recess in the rear face of its shank, and a resilient holding means engaged with said shank, said resilient holding means having a body portion engaged in said recess, and a resilient portion extending outwardly therefrom.

18. A cutter bit device having a head and an elongated shank, said elongated shank having edge portions one of which is provided with a shallow recess extending across it, said recess having undercut edges for the reception of resilient retaining means.

References Cited by the Examiner
UNITED STATES PATENTS

| | | | |
|---|---|---|---|
| 1,868,247 | 7/1932 | Page | 37—142 |
| 1,958,024 | 5/1934 | Stowell | 267—1 |
| 2,747,852 | 5/1956 | Krekeler | 262—860 |
| 2,907,559 | 10/1959 | Brown et al. | 262—860 |
| 2,916,275 | 12/1959 | Bruestle et al. | 262—860 |
| 3,021,124 | 2/1962 | Bowen | 262—860 |
| 3,093,366 | 6/1963 | Proctor | 262—860 |

FOREIGN PATENTS

| | | |
|---|---|---|
| 1,150,034 | 6/1957 | France. |
| 87,241 | 4/1956 | Norway. |

BENJAMIN HERSH, *Primary Examiner.*